US005753900A

United States Patent [19]

Goodwin, III et al.

[11] Patent Number: 5,753,900

[45] Date of Patent: May 19, 1998

[54] ELECTRONIC PRICE LABEL HAVING A SWITCHED LIGHT

[75] Inventors: John C. Goodwin, III, Suwanee; Jeffry S. Rollins, Lawrenceville, both of Ga.

[73] Assignee: NCR Corporation, Dayton, Ohio

[21] Appl. No.: 730,728

[22] Filed: Oct. 15, 1996

[51] Int. Cl.[6] .......... G06K 15/00

[52] U.S. Cl. .......... 235/383

[58] Field of Search .......... 235/383

[56] References Cited

U.S. PATENT DOCUMENTS

| | | | |
|---|---|---|---|
| 4,002,886 | 1/1977 | Sundelin . | |
| 4,500,880 | 2/1985 | Gomersall et al. | 340/825.35 |
| 4,924,363 | 5/1990 | Kornelson | 362/125 |
| 5,172,314 | 12/1992 | Poland et al. | 364/401 |
| 5,241,467 | 8/1993 | Failing | 235/383 X |
| 5,448,226 | 9/1995 | Failing, Jr. et al. | 340/825.35 |

*Primary Examiner*—Harold Pitts
*Attorney, Agent, or Firm*—Paul W. Martin

[57] ABSTRACT

An electronic price label (EPL) which has a light for attracting attention of customers to an item associated with the EPL. The EPL further includes a power supply and a control circuit for controlling application and removal of power from the power supply to the light. In a first embodiment, the control circuit responds to commands from a controlling computer. In a second embodiment, the control circuit includes a push-button switch containing the light.

14 Claims, 2 Drawing Sheets

ELECTRONIC PRICE LABEL HAVING A SWITCHED LIGHT

BACKGROUND OF THE INVENTION

The present invention relates to electronic signage, and more specifically to an electronic price label (EPL) having a switched light.

EPL systems typically include a plurality of EPLs for each merchandise item in a store. EPLs typically display the price of corresponding merchandise items on store shelves and are typically attached to a rail along the leading edge of the shelves. EPLs may include a semitransparent LCD. A store may contain thousands of EPLs to display the prices of the merchandise items. The EPLs are coupled to a central server from where information about the EPLs is typically maintained in an EPL data file. Price information displayed by the EPLs is obtained from the PLU file.

To keep the cost of EPLs to a minimum, store owners use EPLs to display minimal information, including price and price per unit. To display other information that changes infrequently, store owners attach overlays that display information that changes infrequently. These overlays are made of paper and information such as item descriptions, bar code labels, messages to the customer, package sizes, reorder codes, and other information. The overlays are coated with an adhesive material and applied to the front surfaces of the EPLs.

Unfortunately, overlays are not easily distinguishable from each other and are difficult to use for promoting special items. Use of promotional overlays suffers from the disadvantages of having to print and attach a new overlay to the EPL. Eventually, the number of overlays attached to an EPL builds up. Removal of old overlays is time-consuming, costly, and wasteful. Also, attachment of new overlays may be difficult and result in damage to overlays and resulting waste.

Therefore, it would be desirable to provide an EPL that has built-in promotional capability.

SUMMARY OF THE INVENTION

In accordance with the teachings of the present invention, an electronic price label (EPL) having a switched light is provided.

The light attracts attention of customers to an item associated with the EPL. The EPL further includes a power supply and a control circuit for controlling application and removal of power from the power supply to the light. In a first embodiment, the control circuit responds to commands from a controlling computer. In a second embodiment, the control circuit includes a push-button switch containing the light.

It is accordingly an object of the present invention to provide an EPL having a switched light.

It is another object of the present invention to provide an EPL having a light controlled by a push-button switch.

It is another object of the present invention to provide an EPL having a push-button LED switch.

It is another object of the present invention to provide an EPL having a light controlled remotely by a controlling computer.

It is another object of the present invention to provide an EPL that can be easily configured for promotional purposes.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
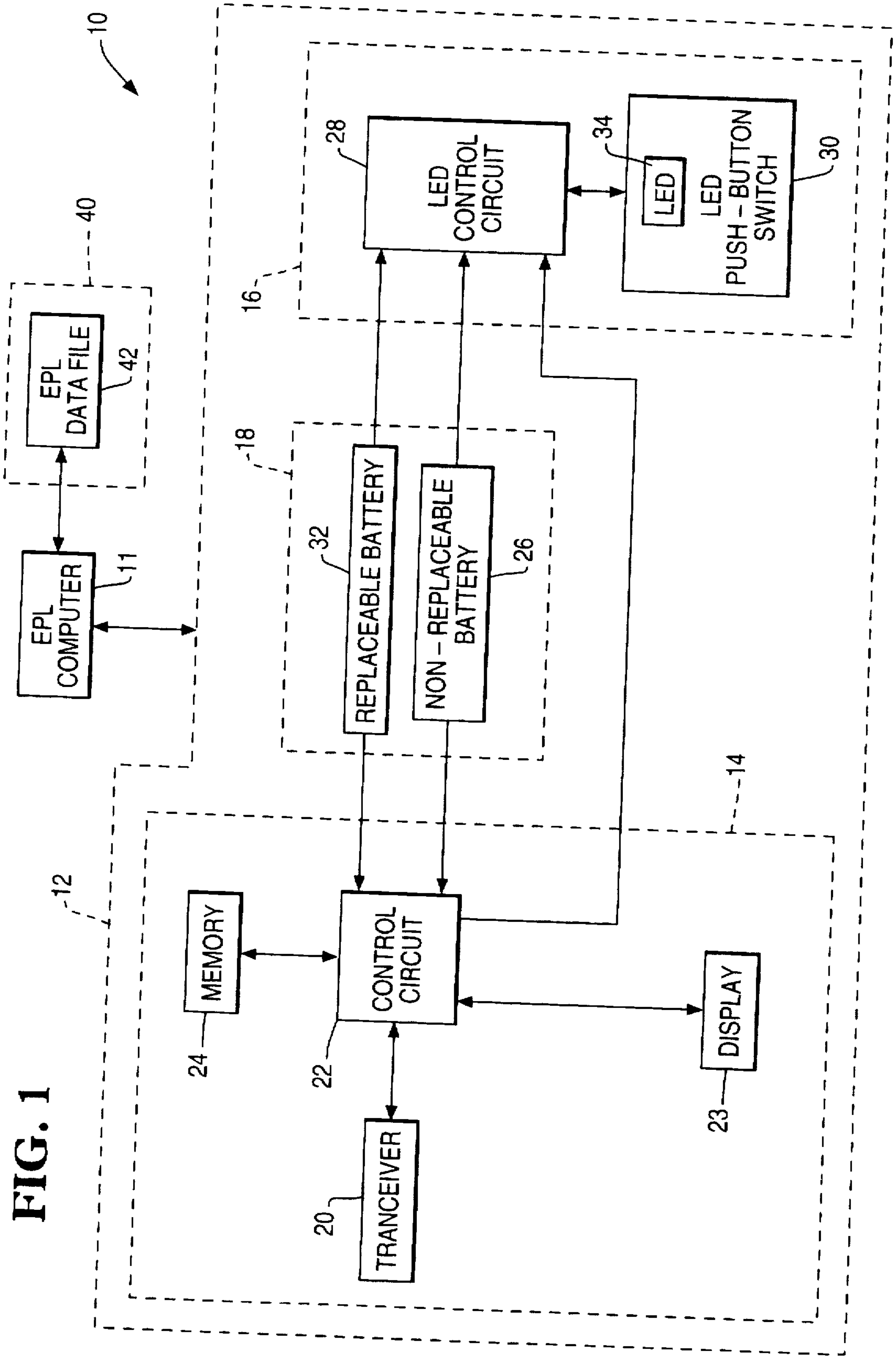
FIG. 1 is a block diagram of an electronic price label (EPL) of the present invention.
Figure 2:
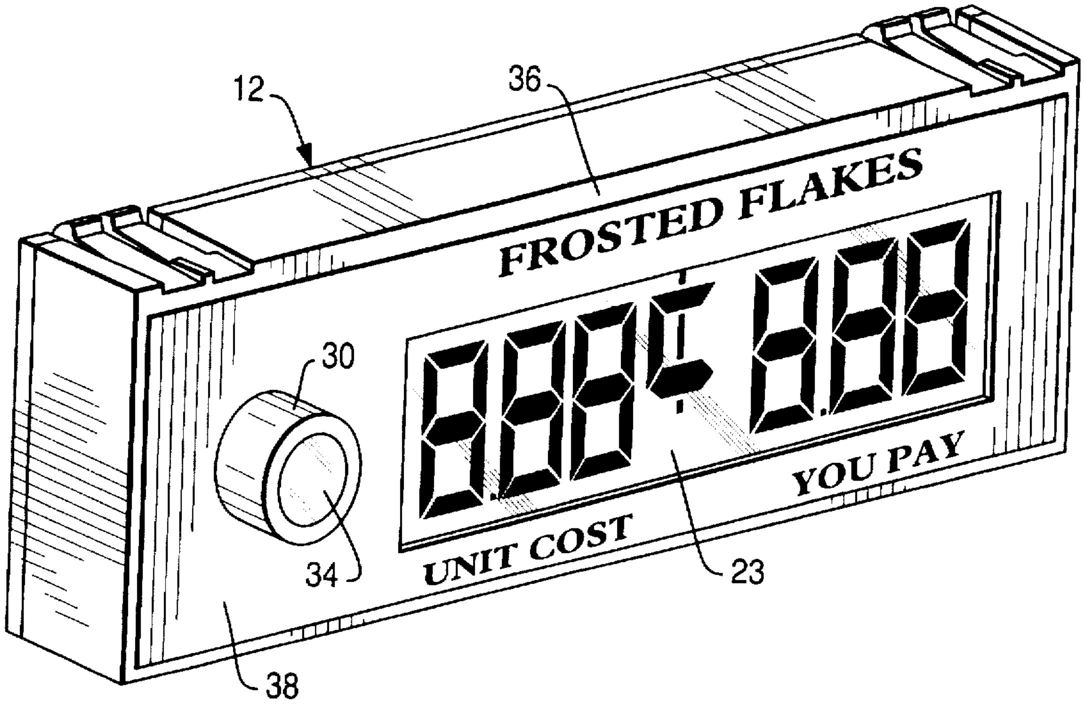
FIG. 2 is a perspective view of the EPL.

Referring now to FIG. 1, electronic price label (EPL) system 10 includes EPL computer 11 and EPL 12. EPL system 10 may include wireless communication, cable communication, or a combination of both.

EPL computer 11 records, schedules, and transmits all messages to EPL 12 and analyzes status messages from EPL 12. Messages from EPL computer 11 include price change messages, diagnostic messages, and promotional messages.

EPL computer 11 may also transmit an LED control message to turn on or blink LED 34.

EPL computer 11 maintains and uses EPL data file 42, which contains item information, identification information, item price verifier information, and status information for EPL 12 and other EPLs within system 10.

EPL data file 42 also stores LED operating information (manual/auto-off, on, or blinking) to allow EPL computer 11 to control operation of LED 34. The "manual" mode indicates manual activation of LED push-button 30 while the "auto" mode indicates automatic control by EPL computer 11.

Storage medium 40 stores EPL data file 42.

EPL 12 includes price reporting circuit 14, promotion circuit 16, and power supply 18.

Price reporting circuit 14 displays prices of associated items and includes transceiver 20, control circuit 22, display 23, and memory 24.

Transceiver 20 receives price change and other messages from EPL computer 11, and transmits acknowledgment messages to EPL computer 11.

Control circuit 22 controls operation of price reporting circuit 14, including control of its power source from power supply 18. Control circuit 22 also receives LED control messages from EPL computer 11 and relays control instructions within the messages to LED control circuit 28.

Display 23 displays price changes under control of control circuit 22.

Memory 24 stores price changes under control of control circuit 22.

Promotion circuit 16 draws the attention of customers to particular EPLs and includes LED control circuit 28 and LED push-button switch 30.

LED control circuit 28 controls power application to LED push-button switch 30. LED control circuit 28 may provide continuous power or apply and remove power to give LED 34 the appearance of blinking. When LED 34 is being controlled by EPL computer 11 in the automatic mode, LED control circuit 28 disables LED push-button switch 30.

LED push-button switch 30 applies power to its internal LED 34 through LED control circuit 28 when engaged in the "on" position and removes power from LED control circuit 28 when engaged in the "off" position. When in the "on" position, LED 34 is luminous enough to be distinguishable from other EPLs and their surroundings to a customer in an aisle where LED 34 is resident.

The use of switched lights allows store personnel to easily add and remove promotional items. LED push-button switch 30 is one example of the use of light as a promotional tool. Other types of lighted switches and light/switch combinations are also envisioned, but the LED push-button switch is favored because it requires very little area of front surface 36 of EPL housing that might otherwise be used by an overlay 38.

Power supply 18 includes a first battery, which is typically a non-replaceable battery 26, and a second battery, which is a replaceable battery 32. Non-replaceable battery 26 is the primary power supply for price reporting circuit 14 and replaceable battery 32 is the primary power supply for promotion circuit 16. Control circuit 22 controls selection of power to price reporting circuit 14 and LED control circuit 28 controls selection of power to promotion circuit 16. Thus, non-replaceable battery 26 may act as a backup power supply for price reporting circuit 14 and replaceable battery 32 may act as a backup power supply for promotion circuit 16.

Although the present invention has been described with particular reference to certain preferred embodiments thereof, variations and modifications of the present invention can be effected within the spirit and scope of the following claims.

What is claimed is:

1. An electronic price label (EPL) comprising:

a housing;

a display within the housing for displaying price information;

a light within the housing and separate from the display for attracting the attention of customers to an item associated with the EPL;

a power supply, including a first battery and a second battery, wherein the second battery is replaceable; and a control circuit within the housing for controlling application and removal of power from the power supply to the light, wherein the control circuit applies power from the first battery only when the second battery is exhausted.

2. The EPL as recited in claim 1, wherein the light comprises a LED.

3. The EPL as recited in claim 1, wherein the control circuit comprises a push-button switch.

4. The EPL as recited in claim 1, wherein the control circuit responds to commands for controlling power to the light from a controlling computer.

5. The EPL as recited in claim 1, wherein the control circuit causes the light to blink.

6. The EPL as recited in claim 1, wherein the control circuit comprises a push-button switch which contains the light.

7. The EPL as recited in claim 6, wherein the push-button switch is on a front surface of the EPL.

8. The EPL as recited in claim 1, wherein the power supply comprises a battery.

9. The EPL as recited in claim 8, wherein the battery is a replaceable battery.

10. An electronic price label (EPL) system comprising:

an EPL including a housing;

a display within the housing for displaying price information;

a light within the housing and separate from the display for attracting the attention of customers to an item associated with the EPL;

a power supply, including a first battery and a second battery, wherein the second battery is replaceable; and a control circuit within the housing for controlling application and removal of power from the power supply to the light, wherein the control circuit applies power from the first battery only when the second battery is exhausted; and a computer for controlling the control circuit to promote the item.

11. A method of promoting a product associated with an electronic price label (EPL) comprising the steps of:

(a) providing the EPL with a light within a housing of the EPL but separate from a display which is also within the housing;

(b) applying power from a first battery within the EPL to the light during a promotional event to attract customer attention to the product by a control circuit within the EPL;

(c) applying power from a second battery to the light only if the first battery is exhausted by the control circuit; and (d) removing power from the light by the control circuit after the promotional event has ended.

12. The method of claim 11, wherein step b comprises the substeps of:

(b-1) sending a command from a controlling computer to the EPL to control power to the light;

(b-2) receiving the command by the EPL; and (b-3) executing the command by the control circuit.

13. The method of claim 12, wherein step b-1 comprises the substeps of:

(b-1-A) reading a data file listing a light operating mode by the controlling computer;

(b-1-B) determining the command;

(b-1-C) creating a message addressed to the EPL which contains the command; and (b-1-D) transmitting the message.

14. The method of claim 11, wherein step b comprises the substeps of:

(b-1) providing the EPL with a push-button switch containing the light; and (b-3) controlling power to the light in response to movement of the push-button switch by an operator.

* * * * *